(No Model.)
J. W. BLACK.
CARRIAGE FENDER.
No. 349,247. Patented Sept. 14, 1886.
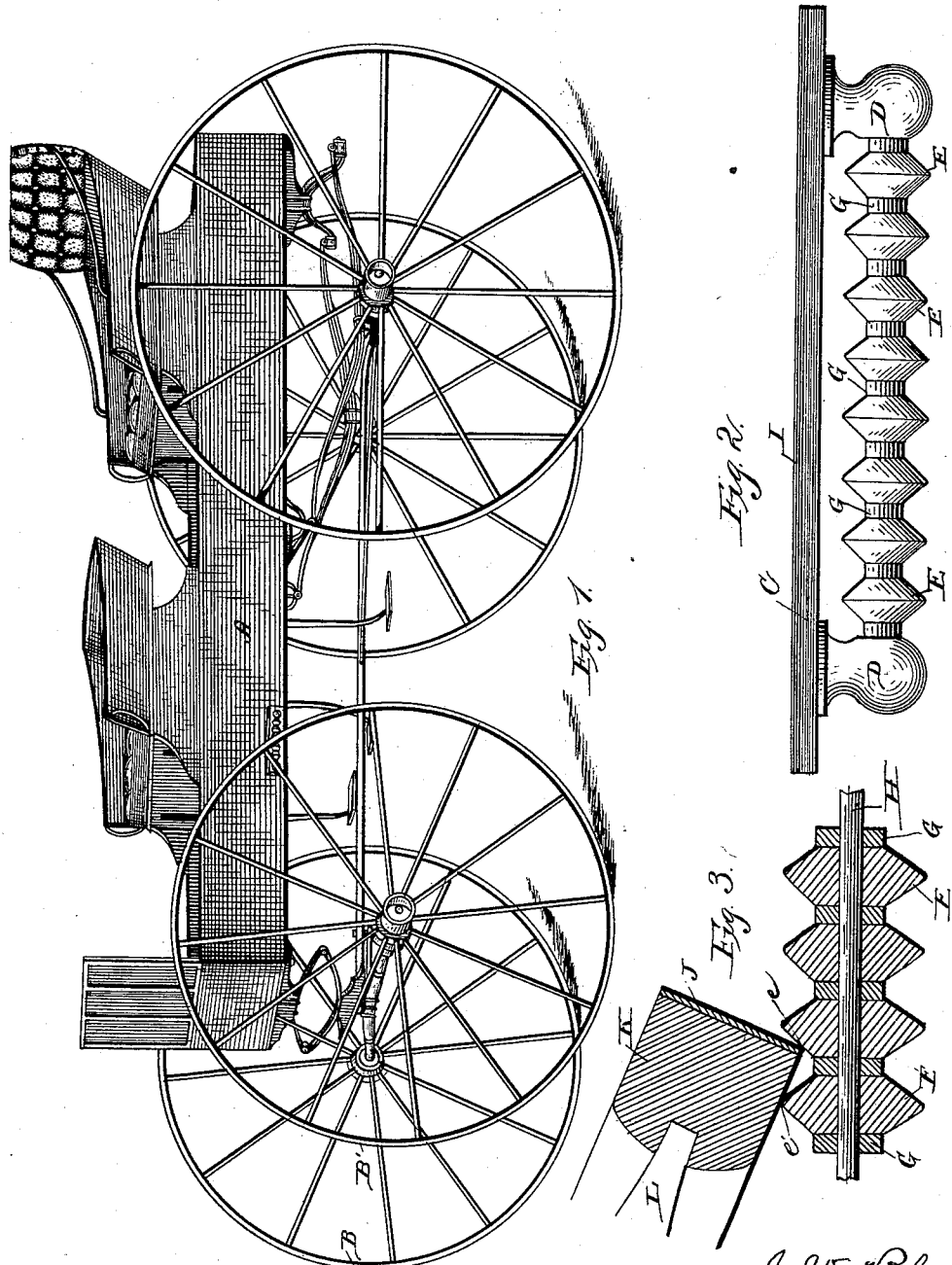

UNITED STATES PATENT OFFICE.

JAMES WILLIAM BLACK, OF BERWICK, NOVA SCOTIA, CANADA.

CARRIAGE-FENDER.

SPECIFICATION forming part of Letters Patent No. 349,247, dated September 14, 1886.

Application filed September 28, 1885. Serial No. 178,438. (No model.)

*To all whom it may concern:*

Be it known that I, JAMES WILLIAM BLACK, of Berwick, in the Province of Nova Scotia, Canada, have invented certain new and useful Improvements in Carriage-Fenders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to fenders or rub-irons for carriages, wagons, &c., and has for its object to produce an article of this class which shall be simple, cheap, durable, and effective; and with this end in view my invention consists in the construction, arrangement, and combination of parts, which I shall now proceed to fully describe, and afterward to specifically point out in the claims.

In the drawings, Figure 1 is a perspective view of a wagon of the class known to the trade as "half-platform wagon," having my improved fender attached. Fig. 2 is a view of the fender detached and shown on a large scale; and Fig. 3 is a sectional view of part of my improved fender, showing the manner in which the wheel comes in contact therewith in turning.

Like letters of reference mark the same parts in all the figures.

Referring to the drawings by letters, A is the body, and B and B' are the front wheels, of the wagon. These being the only parts of the wagon necessary to mention in connection with my fender, all the other parts of the wagon being of ordinary construction, I have not marked them by letters of reference.

My fender is composed of a base-plate, C, two upright bearing-blocks, D D, and a composite roller composed of small rollers E E, interposed washers G G, and a shaft, H. The bearing-blocks D D are removably secured to the base-plate by any suitable means, preferably by screws passed through the base-plate from the rear.

I is a rubber cushion or sound-deadener. J is the tire, K the rim, and L one of the spokes of one of the front wheels, B B'.

The fender is secured to the side of the wagon-body A by any suitable means, preferably by screws $a$ through the base-plate and rubber cushion, thus rigidly securing the fender to the body, with the rubber cushion securely between them.

The operation of my device may be described as follows, viz: The parts being in position, as shown in Fig. 1, and it being desired to turn the wagon, one of the front wheels, B B', is brought into contact with the fender, the tire resting against one of the rollers, as at $e$, and the side of the rim or felly resting against the side of the adjoining roller. As the wheel turns, the rollers will turn independently of each other, and a rolling friction take place independently with the tire and the rim, the two being, as before described, in contact with the independently-revolving rollers. As is well known, any portion of the wheel inside the tire moves slower than the tire when the wheel rotates. This motion, were the roller of one piece, would cause a rubbing friction at the point $e'$; but with my construction every contact causes an independent rolling friction and prevents marring of the surface of the wheel. The rubber cushion deadens all sound, making the device noiseless.

The device may be used until one or more of the rollers become worn, when it practically can be renewed by taking it apart and changing the position of the rollers E E on the shaft, either by interchanging them in position or by reversing them on the shaft H. The device will thus outwear many such fenders when provided with a single roll.

I have shown the device in Fig. 1 as applied to a half-platform wagon; but it is to be understood that it may be applied to any kind of a vehicle.

Having thus fully described my invention, what I claim, and desire to secure by Letters Patent, is—

1. A fender for wagons, consisting of a composite roller formed of a single shaft having independent rollers thereon, each of which is of the form of two frustums of a cone joined together at their bases and mounted in suitable bearings attached to the wagon, as set forth.

2. The combination, with the base-plate, bearings, shaft, and independent rollers, of the rubber cushion interposed between the base-plate and the wagon-body, for the purpose set forth.

3. The combination of the bearing-posts secured to the wagon, the shaft H, the independent rollers E E, each of which is substantially in the form of two frustums of a cone joined together at their bases, and the interposed washers, for the purpose set forth.

In testimony that I claim the foregoing as my own I hereunto affix my signature in presence of two witnesses.

JAMES WILLIAM BLACK.

Witnesses:
MARIA MARSTERS,
A. STANLEY FISHER.